Patented Jan. 22, 1935

1,988,465

UNITED STATES PATENT OFFICE 1,988,465

PROCESS OF PREPARING SOLID OR LIQUID SOLUTIONS CONTAINING HARDENABLE PHENOL-ALDEHYDE RESINS AND AIR DRYING FATTY OILS

Fritz Seebach, Erkner, near Berlin, Germany, assignor to Bakelite Gesellschaft mit beschränkter Haftung, Berlin, Germany No Drawing. Application October 29, 1930, Serial No. 492,100. In Germany November 25, 1929

6 Claims. (Cl. 260—4)

In trying to dissolve a heat-hardenable phenol-aldehyde resin or resole by heating with an air-drying oil, such as linseed oil, a definite limiting temperature is soon reached where the resole gelatinizes and is converted into the infusible condition without even having been thoroughly spread throughout the mixture due to its slow solubility in oil. It has now been found that, according to the method specified below, solution of resoles in fatty oils in all proportions, may be prepared, which remain stable, may be diluted and unite all the advantages of the two components. The process, according to this invention, consists of first melting a non-hardenable phenol aldehyde condensation product of the novolak type with a fatty oil, according to the known methods, as for example those applied in the varnish industry in dissolving natural copals in linseed oil. This melt is cooled to about 80–100° C. and then, to convert the novolak, into a hardenable resin, hexamethylenetetramine or some other hardening agent such as methylene-aniline, paraform or quinone is added in quantity sufficient to form a resole with the novolak. This mixture is then heated again to a somewhat higher temperature, as 140–150° C. and thereby a product is obtained which, according to ratio of the oil and resin used, is a liquid or solid product at ordinary temperatures and dissolves in oil of turpentine in any proportion in the cold or in the heat.

According to the present process, a liquid or solid solution of a resole in an air drying oil is obtained which may be diluted to any desired degree with the solvents commonly used in the varnish industry or is soluble therein, without separating out either of the two components. Such a solution is capable of yielding air-drying coatings as well as films that are hardenable on heating due to their resole content. If air-drying coatings are to be made, it is desirable to add a liquid drier to the varnish, prepared for example with turpentine. The air drying of coatings thus made then takes place very rapidly. The substances may also be used without diluents. In view of some of their favorable characteristics, as for example their easy fusibility and the high degree of fluidity of the melted mass, they are very well suited for molding all sorts of objects. Thus the molten materials may be kept at 100° C. for several hours. This characteristic offers certain advantages, especially in preparing larger molded pieces, as air bubbles and other gases then have sufficient time to escape from the molten mixture. The filling of the molds may also be done casually as the substances in molten condition have great stability in their chemical behavior as long as the temperature limit is not overstepped. The hardened products have a considerable elasticity and are more resistant to mechanical stress than products from pure phenol-aldehyde resins. Panels and disc-like articles, which show only a slight tendency to splintering, may therefore also be made. Likewise the products of the process in molten or dissolved condition may be used for impregnating porous substances, and for the manufacture of laminated products such as cardboard, etc.

The liquid or fatty solutions of resoles in air-drying oils named above may also be so treated that they are not converted directly into the "C" state by heating, but by carrying the polymerization, only to the state designated as the "B" state in synthetic resin practice rather than to the "C" state. This "B" state is reached if the melt is heated at a proper temperature, for example 150° C. Gelatinization then sets in and a product is obtained which is a ompletely homogeneous mixture of an air-drying fatty oil and "B" resin. It is remarkable that this product also readily dissolves in turpentine by boiling it with the turpentine. This form of procedure has the advantage that the product contains the hardenable resin in a highly molecular form which therefore is especially resistant to chemical influences. This advantage is most important in coatings which are only to be air-dried, and not subsequently heated.

*Example 1.*—50 kilos phenol condensation products of a novolak type, for example prepared from cresol, formaldehyde and muriatic acid as catalyst, and 50 kilos linseed oil are melted without special attention and are heated until a trace of phenol or cresol starts transforming. The temperature then is about 300° C. After cooling the melt to about 100° C., 3 kilos hexamethylenetetramine are mixed in, and the substance is again heated to 130–150° C., and then allowed to cool. The resulting substance is solid and hardens completely at 120° C. within a day.

*Example 2.*—Procedure as in Example 1; the mass is heated to 150° C., after adding hexamethylenetetramine, and this temperature is maintained until the mass shows signs of gelatinization, as shown by the conversion of resole into the resitole. Then a calculated quantity of a heated solvent, for example oil of turpentine may be added and boiling continued with stirring until a solution forms.

The invention is not limited to the use of novolaks prepared in any definite manner, nor to the use of specific fatty oils or hardening agents. It is possible to use any kind of novolak (for example one prepared with acids, or without a catalyst) and react this with suitable fatty air-drying oils, for example wood oil, perilla oil, sunflower oil, "Stand" oil, blown oils, and suitable hardening agents, for example the above-mentioned hardeners, containing free methylene groups or furfural or quinone. Mixtures of several novolaks or of fatty oils, or of several hardening agents may also be used. The proportions of resin and oil may vary within wide limits. The quantity of the hardening agent is such, that the novolak is converted into a hardenable resin. However, an excess of the hardening agent, for example, furfural, may be added. Other additions, besides the hardeners, as for example, substances accelerating the hardening, dyes, plasticizing agents, softening agents, etc. may be made. The products obtained may naturally be combined with all known fibrous or other fillers.

I claim:

1. A heat-hardenable oil composition consisting essentially of a heat-treated solution of a novolak resin in an air drying fatty oil and a hardening agent, said composition being substantially identical with that producible by carrying out the process defined in claim 2.

2. Process of preparing heat-hardenable oil compositions which comprises heating a solution of a novolak in a fatty oil to an elevated temperature at which phenol begins to distil, and thereafter adding to the resulting solution a hardening agent in amount at least sufficient to form a resole and heating to a stage at which the product is soluble in oil of turpentine.

3. Process of preparing heat-hardenable oil compositions which comprises dissolving and heating a novolak in a fatty oil to an elevated temperature of the order of about 300° C., thereafter adding to the resulting solution at a temperature of not exceeding about 100° C. a hardening agent in amount at least sufficient to form a resole and heating the mixture at a temperature above 100° C.

4. Process of preparing heat-hardenable oil compositions which comprises dissolving a phenolic novolak in a fatty oil comprising linseed oil, heating the resulting solution of resin in oil to a temperature at which phenol begins to distil, cooling the resulting solution to a temperature of from about 80° to about 100° C., adding a hardening agent in amount at least sufficient to form a resole and reacting the hardening agent with said solution at a temperature of the order of 140°–150° C.

5. Process of preparing heat-hardenable oil compositions as defined in claim 2 characterized in that the hardening agent is added in amount in excess of that required to cause the conversion of the novolak.

6. A heat-hardenable oil composition consisting essentially of a heat-treated solution of a novolak resin in an air-drying fatty oil reacted with a hardening agent, said composition being substantially identical with that producible by carrying out the process defined in claim 2.

FRITZ SEEBACH.